June 9, 1964 G. A. WAHLMARK 3,136,264
VARIABLE DISPLACEMENT FLUID DEVICE
Filed Sept. 9, 1959 5 Sheets-Sheet 1
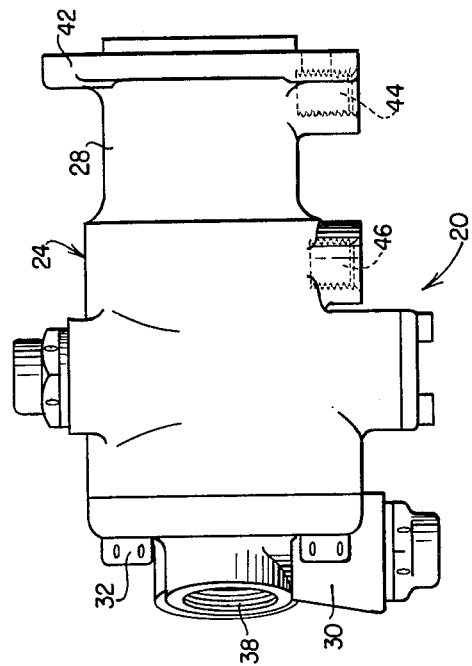
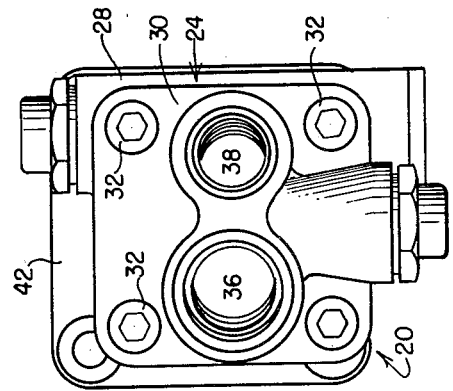
INVENTOR.
Gunnar A. Wahlmark
BY
Byron Hume Groen & Clement
Attys.

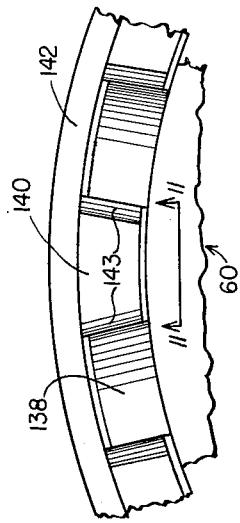
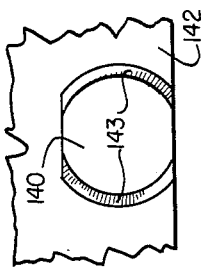
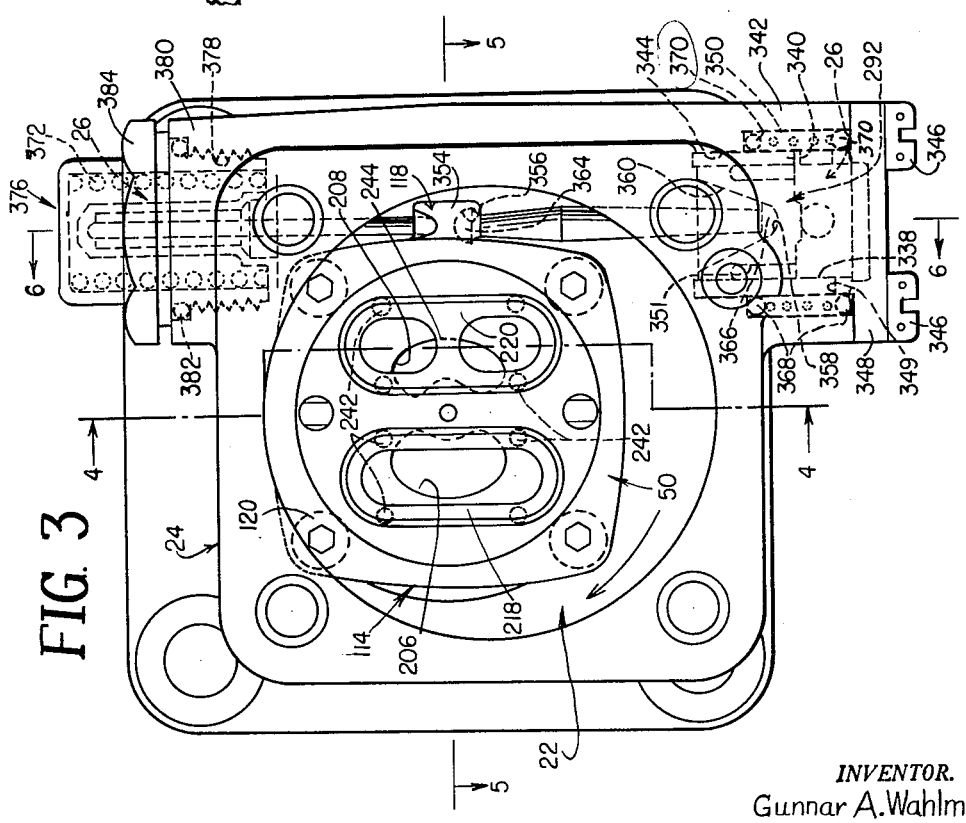
INVENTOR.
Gunnar A. Wahlmark

INVENTOR.
Gunnar A. Wahlmark

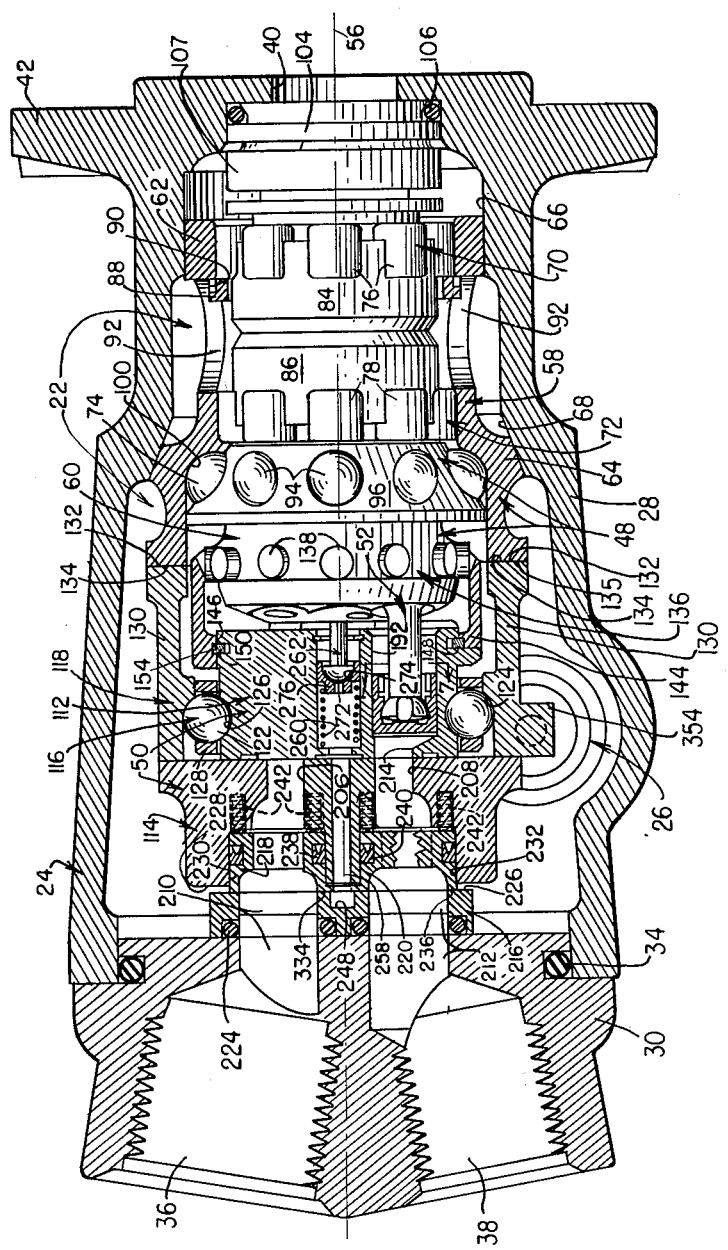

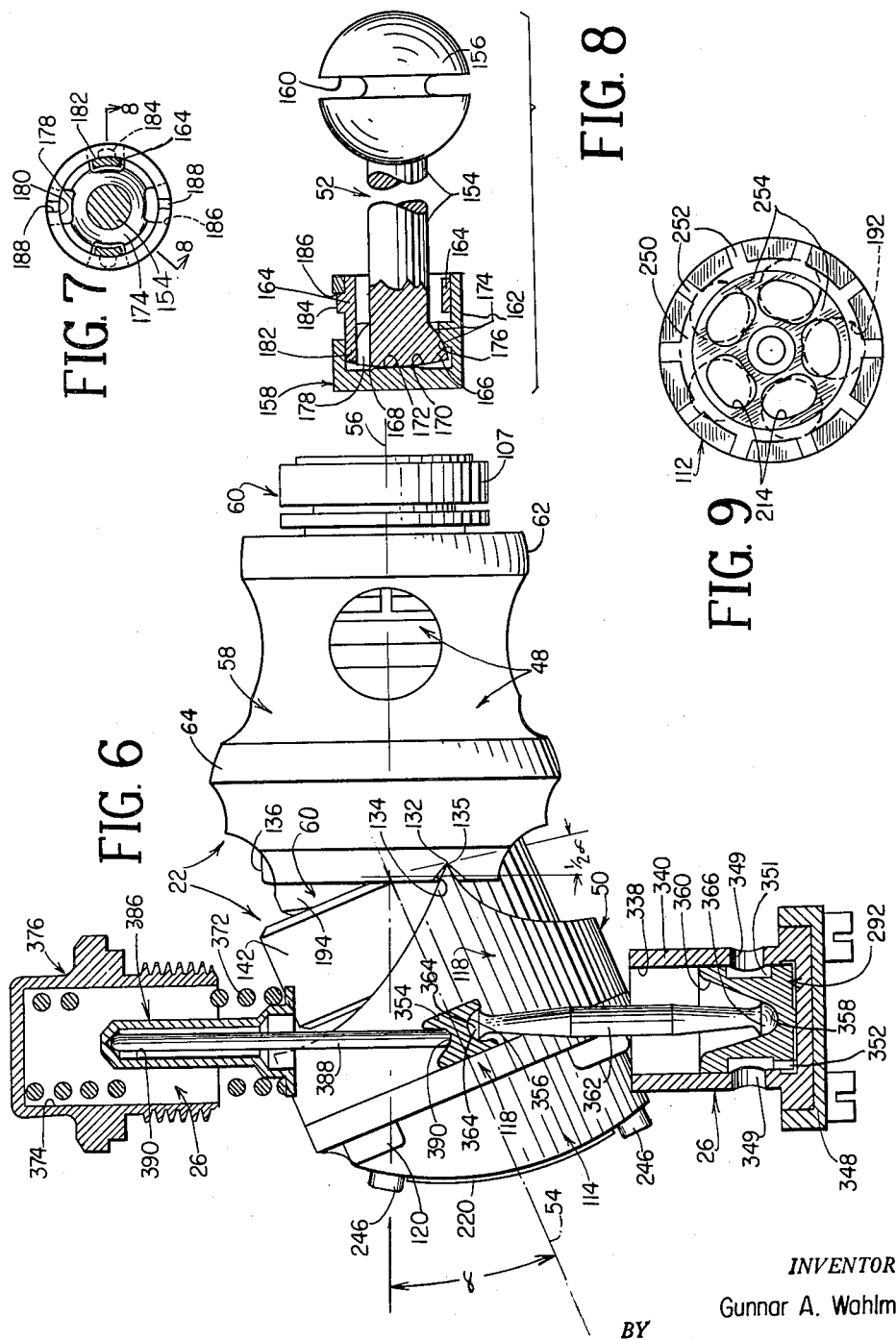

United States Patent Office 3,136,264
Patented June 9, 1964

3,136,264
VARIABLE DISPLACEMENT FLUID DEVICE
Gunnar A. Wahlmark, 211 S. Rockford Ave.,
Rockford, Ill.
Filed Sept. 9, 1959, Ser. No. 838,868
16 Claims. (Cl. 103—162)

This invention relates to fluid devices. More particularly, the invention relates to a variable displacement fluid pump or fluid motor. The term "fluid" is used in its broad sense to cover any substance capable of being pumped. However, for simplicity of presentation, the invention will be described primarily in connection with its hydraulic applications.

In the technology of fluid pumps and motors the trend has been toward higher speed, lighter weight units in order to achieve greater performance with units which take up less space and which weigh less. This is particularly true in the aircraft and missile industries. In missiles and space vehicles, for example, small sizes and low weights are essential, and at the same time increased efficiencies and greater performance are vital.

The various features of the present invention are particularly important when applied to extremely high performance pumps and motors used in aircraft and missiles. Accordingly, the particular embodiment of the invention which is described herein is a light weight, extremely high speed hydraulic pump which is adapted to be driven by a high speed power source, such as a gas driven turbine. For example, such a turbine, together with the pump of the present invention, might constitute the essential portions of an auxiliary power unit (APU) in an airborne or space vehicle in order to supply hydraulic power for operating the various controls and other mechanisms of the vehicle. It will be understood, however, that the various concepts of the invention are not limited to this particular application but are generally applicable to fluid pumps and motors for any purpose whatsoever.

Since the demands for hydraulic power vary widely in airborne and space vehicles, depending upon the number and extent of actuation of the various servo mechanisms at any given time, it is desirable to vary the output of the pump in accordance with the hydralic power demand. This can be accomplished by by-passing the pump to the inlet in some manner, but this method of output variation results in very low efficiency at low output flow.

From the standpoint of efficiency, it is desirable to reduce the actual pumping displacement of the pump in accordance wtih reduced output demands, and to achieve, theoretically at least, zero flow at zero output demand. Prior attempts at reducing displacement, however, have resulted in undue complication, tendency toward pump cavitation, and lack of adequate lubrication and cooling at low flow.

An important feature of the present invention is the incorporation of simple, compact and highly efficient means for reducing pump displacement in accordance with pump output requirements.

It is an object of this invention to provide an improved fluid pump and/or motor.

Another object of the invention is to provide an improved variable displacement fluid device.

A further object is to provide an improved hydraulic pump and/or motor capable of operating efficiently at extremely high speeds.

Still another object of the present invention is to provide an improved variable displacement hydraulic pump incorporating simple and highly efficient mechanism for varying the pump displacement in accordance with the output requirements.

A still further object of the invention is to provide an improvement in hydraulic devices wherein adequate lubrication of all parts is achieved regardless of output flow and regardless of speed of operation.

An additional object of the invention is to provide a swash plate piston type variable displacement hydraulic device eliminating the ordinarily required pivot bearings between the cylinder barrel and the swash barrel.

Another object of the invention is to provide a swash plate type device embodying a simplified and improved constant velocity universal joint between the swash barrel and the cylinder barrel.

A further object of the invention is to provide an improved light weight piston for use in a piston type fluid device.

Still a further object is to provide a piston assembly in which the force between the piston head and the piston rod is transmitted through rolling contact.

An additional object is to provide a variable displacement piston type fluid device in which the piston head clearance at top dead center remains generally constant regardless of the piston stroke.

Still another object of the invention is to provide a variable displacement piston type fluid device in which the piston head clearance at top dead center is maintained at a very small value, particularly at low displacement, in order to increase efficiency of the device and to reduce danger of cavitation.

A still further object of the invention is to provide improved and simplified control mechanism for controlling the output of a variable displacement fluid device.

A specific object of the invention is to provide an improved hydraulic device which can be easily and quickly assembled and disassembled.

Other objects, features and advantages will be apparent from the following detailed description, taken in conjunction with the accompanying drawings, in which:

FIGURE 1 is a longitudinal elevational view of a particular embodiment of hydraulic device according to the present invention.

FIGURE 2 is an elevational view of the port end of the hydraulic device shown in FIGURE 1.

FIGURE 3 is an enlarged end elevational view similar to FIGURE 2 but with the port end cap of the housing removed, showing the device in its zero displacement condition.

FIGURE 5 is a sectional view taken substantially along line 5—5 of FIGURE 3.

FIGURE 6 is a sectional view taken along line 6—6 of FIGURE 3 but with the housing removed for simplification and showing the device in its maximum displacement condition.

FIGURE 7 is an enlarged sectional end view of one of the pistons of the hydraulic device, taken substantially along line 7—7 of FIGURE 5.

FIGURE 8 is a partly sectional view taken substantially along line 8—8 of FIGURE 7.

FIGURE 9 is an elevational view of the port end of the cylinder barrel of the hydraulic device.

FIGURE 10 is an enlarged fragmentary view of the engaged teeth of the constant velocity universal joint with the pump at zero displacement.

FIGURE 11 is an end view of one of the spline teeth taken substantially along line 11—11 of FIGURE 10.

Figure 4:
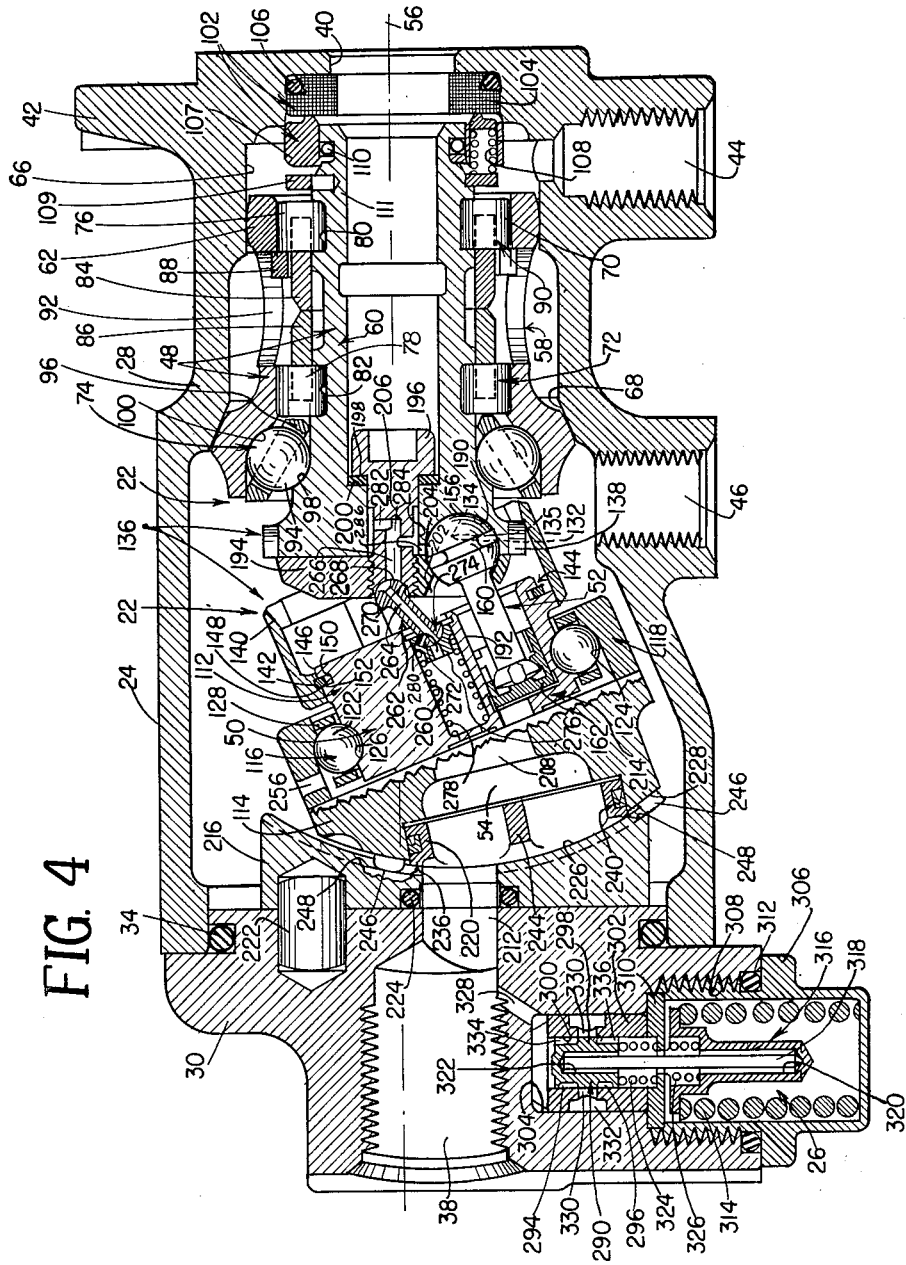
FIGURE 4 is a sectional view taken substantially along line 4—4 of FIGURE 3 but showing the device in its maximum displacement condition.

The embodiment of the present invention which is illustrated in the drawings is a variable displacement fluid pump (or motor) and is generally designated by the reference numeral 20. The device comprises a variable displacement pump mechanism assembly 22 operatively disposed in a casing or housing 24. The displacement of the pump mechanism is automatically controlled by control apparatus 26. The specific device shown is a "swash plate" piston type hydraulic device in which the displacement is varied by varying the stroke of the pistons through change in the swash angle between the cylinder barrel and the swash barrel.

The pump housing 24 is of two piece construction and includes a body portion 28 and a port end cap portion 30. The end cap 30 is fixedly secured at one open end of the body 28 by means of a plurality of attachment screws 32 or the like, and an O-ring seal 34 of suitable relatively soft sealing material is appropriately disposed between the end cap and the body. An internally threaded inlet port 36 and an internally threaded outlet port 38 are formed through the end cap in side-by-side fashion, extending in a generally axial direction. At the opposite end of the housing an axial drive shaft opening 40 is formed and is adapted to permit free insertion of a splined drive shaft (not shown) from a pump driving source such as a gas driven turbine (not shown). A suitable attachment flange 42 is integrally formed at the shaft opening end of the housing body. An internally threaded lubrication and cooling flow inlet port 44 and an internally threaded outlet port 46 are formed through the bottom of the housing body in appropriately spaced bosses as shown. The two major portions of the housing 24 are formed of a suitable rigid material such as steel or strong aluminum alloy.

*Pump Mechanism 22*

The pump mechanism assembly 22 includes swash mechanism 48 and tiltable cylinder block mechanism 50. These two mechanisms are pivotally associated in a manner to be described in order to change the displacement of the device. Change in the angle between the swash mechanism and the cylinder block mechanism results in change in the stroke of a plurality of pistons 52 which are operatively disposed between the swash mechanism 48 and the cylinder block mechanism 50. With the hydraulic device in the condition shown in FIGURES 3 and 5, the axis 54 of the cylinder block mechanism 50 coincides with the axis 56 of the swash mechanism 48, and in this condition the stroke of the pistons is zero. With the hydraulic device in the condition shown in FIGURES 4 and 6, these axes are disposed at the maximum "swash" angle, designated by the symbol $\alpha$ so that maximum displacement and maximum stroke of the pistons are achieved. It will be understood that an infinite number of different piston strokes and displacements are achieved with the axes at lesser swash angles than the maximum swash angle shown in FIGURES 4 and 6. The various elements of the swash mechanism 48 and the cylinder block mechanism 50 are formed of suitable rigid materials, preferably metal such as appropriately hardened steels, unless otherwise indicated.

The pump mechanism is adapted to be rotated in a clockwise direction when viewed from the port end, or in a counterclockwise direction when viewed from the drive end. The swash mechanism 48 includes an outer stationary bearing shell 58 and an inner rotatable swash barrel 60. The bearing shell 58 is firmly seated within the housing 24 through a support ring 62 at one end portion and a support ring 64 at its opposite end portion. The support ring 62 is spherically ground as shown from a center on the axis 56 for ease of insertion into the housing and is firmly seated within a cylindrical bearing seat 66 formed within the housing.

The integral support ring 64 is also spherically ground on its outer surface but on a larger radius from a center disposed along the swash mechanism axis 56. The support ring 64 is seated in a frusto-conical thrust support seat 68 formed in the housing and having a minimum radius larger than the radius of the bearing seat 66. The spherical center of the outer surface of the thrust support ring 64 is displaced toward the left as seen in FIGURES 4 and 5 so that the radii of the spherical surface are perpendicular to the frusto-conical surface of the support seat 68 at the line of tangency between the two surfaces. By transmitting the piston thrust through the contacting spherical and frusto-conical surfaces advantage is taken of the resiliency of the metal, permitting very slight axial shifting of the bearing shell in order to automatically take up any bearing wear and to insure that there is no thrust bearing clearance which could cause chattering and subsequent failure of the pump. It will be understood that slight shifting of the bearing shell 58 toward the right as seen in FIGURE 4 will cause the support ring 64 to be squeezed radially inwardly a slight amount to take up any excess bearing clearance. The arrangement also permits relaxation of tolerances in the fit between the spherical surface 64 and the taper seat 68. The angle of taper of the seat 68 is chosen to accommodate the maximum thrust load while still providing radial support and accommodating the bearing take up described.

The swash barrel 60 is rotatably supported within the bearing shell 58 by means of a pair of axially spaced anti-friction roller bearing assemblies 70 and 72 and by means of an anti-friction thrust ball bearing assembly 74.

The roller bearing assemblies 70 and 72 each comprise a plurality of anti-friction rollers 76 and 78 disposed in respective annular grooves 80 and 82 formed about the swash barrel 60. Annular roller bearing cage or retainer members 84 and 86 space the rollers circumferentially as shown. A split snap ring 88 is snapped in an internal annular groove 90 within the bearing shell 58 adjacent the inner edges of the rollers 76. When the swash barrel 60 is properly located, the snap ring 88 is readily accessible through access openings 92 formed through the bearing shell 58. This is to permit the snap ring to be released from the groove 90 by applying radial inward pressure so that the swash barrel 60 can be readily removed from the bearing shell 58. By reason of this simple construction, the bearings can be readily inspected and replaced.

The thrust bearing 74 includes a plurality of anti-friction ball bearings 94 which are maintained in radially spaced relation by means of a frusto-conical cage or retainer 96 which is disposed between an inner race 98 formed on the surface of the swash barrel 60 and an outer race 100 formed within the bearing shell 58 under the support ring 64. The bearing races 98 and 100 are radially and axially opposed as shown in order to accommodate axial thrust of the swash barrel 60 as well as radial loads. The thrust and radial loads are transferred through the ball bearings 94 to the outer bearing race 100 and through the support ring 64 to the taper seat 68 in the housing 24. It will be seen that the parts are so constructed and arranged that the greater the thrust, the greater will be the radial squeeze provided through the taper seat 68 and the spherical surface 64. This prevents the parts from flying apart at the tremendous rotational speeds for which the device is designed and at the same time provides automatic wear take-up without requiring extremely close tolerance fitting.

A rotating seal assembly 102 is provided between the right end portion of the swash barrel 60 and the adjacent end of the housing 24. The seal may comprise a stationary seal plate 104 disposed in an inner housing groove as shown with leakage between the housing and the seal plate being prevented by a suitable O-ring 106. A metallic seal ring 107 is carried by the end portion of the swash barrel 60 and has its right end bearing against the seal plate 104 as shown. A plurality of circumferentially spaced compression springs 107 resiliently urge the seal ring 107 against the seal plate 104 to provide the rotating seal. These springs 108 are bottomed against a support ring 109 which is secured about the end portion of the swash barrel 60 through pin and shoulder means as shown. A suitable O-ring seal 110 is disposed between the end portion of the swash barrel and the seal ring 107 to prevent leakage therebetween. The seal plate 104 may be efficiently formed of a rigid material having reduced friction in contact with metal. An example of such material is "Graphalloy" which is essentially graphite inpregnated copper. The seal assembly 102 is described in more detail in my prior U.S. Patent No. 2,604,736 dated June 2, 1953, entitled "Fuid Seal." It will be seen that the seal 102 permits rotation of the swash barrel 60 while still preventing leakage from within the housing 24 out the drive shaft opening 40.

The swash barrel 60 may be driven through an internal spline 111 which is adapted to receive a drive shaft (not shown) which can be inserted through the drive opening 40 in the housing.

The cylinder block mechanism 50 includes a rotatable cylinder barrel 112 connected to a non-rotatable cylinder end cap 114 by means of an anti-friction ball bearing assembly 116. The end cap 114 is preferably formed of a hard material which has good frictional bearing characteristics when in contact with the steel cylinder barrel 112. A suitable material is bearing bronze, for example.

The end cap 114 is fixedly secured to a pivot control ring 118 by means of a plurality of screws 120 or the like. The ball bearing assembly includes a plurality of anti-friction roller bearings 122 which are disposed between an outer bearing race 124 formed in the control ring 118 and an inner bearing race 126 in the cylinder barrel 112. The ball bearings 122 are held in circumferentially spaced relation by a suitable bearing cage or retainer 128.

The cylinder block mechanism 50 is pivotally associated with the swash mechanism 48 through an off-center knife-edge pivot arrangement according to the present invention. The knife-edge pivot is formed by a pair of integral pivot arms 130 of the pivot control ring 118 which bear against and pivot on the left end of the bearing shell 58. The pivot arms 130 terminate in corresponding knife-edge pivots 132 which pivotally seat in corresponding pivot notches or seat 134 formed in the end face of the bearing shell. The lines of engagement of the two pivots 132 with the apexes of the pivot seats 134 define a pivot axis 135 which is perpendicular to the plane defined by the swash axis 56 and the cylinder axis 54 when they are angularly disposed. This plane may be referred to as the "swash angle plane."

Referring to FIGURE 6, it will be seen that the pivot axis 135 is disposed below the swash axis 56. The pivot axis is so located that a line in the swash plane between the pivot axis and the point of intersection of the axes 54 and 56 defines an angle ½α (equal to one-half the maximum swash angle) with a vertical line in the swash plane, as shown in FIGURE 6. The vertical line lies in a "swash circle plane" which is perpendicular to the swash plane and is so called because it is defined by the pivot centers of the pistons 52 with the swash barrel 60 (see FIGURE 4). This arrangement insures that the axes 54 and 56 will coincide at zero displacement of the pump mechanism 22 and also insures that the piston head clearance of the pistons 52 on top dead center is substantially the same at maximum displacement as it is at zero displacement with practically no variation in between. This latter feature will be described in detail later on.

In order that the cylinder barrel 112 will rotate at a constant speed with respect to the swash barrel 60 regardless of the swash angle, a constant velocity universal joint 136 drivingly connects these two members. The constant velocity joint 136 includes a plurality of identical external drive studs 138 formed on the left end of the swash barrel 60 which coact with internal drive splines or teeth 140 formed within the right end of a drive collar 142. The drive collar 142 is connected to the right end of the cylinder barrel 112 by means of internal splines 144 formed within the left end portion of the drive collar and which coact with external splines 146 formed about the periphery of the cylinder barrel 112. The two parts are prevented from axial displacement by means of a split snap ring 148 which is snapped into an external groove 150 formed about the spline 146 on the cylinder barrel and an internal groove 152 formed in the spline section of the drive collar.

The drive studs 138 are cylindrical as shown and are circumferentially spaced about the left end periphery of the swash barrel 60 with their axes perpendicular to the swash axis 56 and intersecting the swash axis at a common point. These drive studs are so located that the plane defined by their axes contains the pivot axis 135. The internal drive splines 140 of the drive collar 142 correspond in number with the drive studs 138. Referring to FIGURES 10 and 11, it will be seen that the splines 140 are cut with fragmentary frusto-conical sides 143 in a manner such that opposed elements of adjacent splines are parallel to each other. The splines are spaced approximately the same as the diameter of the drive studs 138 leaving only a slight driving clearance when the drive studs are disposed between the splines. Thus when the drive studs 138 are disposed between the drive splines, the cylindrical drive studs will engage the frusto-conical surfaces 143 without any binding or interference as the pump mechanism 22 is rotated regardless of the angle between the swash mechanism and the cylinder block mechanism. A working clearance is provided between the ends of the drive studs 138 and the floors of the drive spline grooves between the splines 140 in a manner to accommodate rotation of the pump mechanism at all swash angles.

Theoretically, it would be desirable to have the axes of the frusto-conical surfaces 143 intersect at the point of intersection of the axes of the drive studs 138. For ease of fabrication, however, the axes of the frusto-conical surfaces are tilted outwardly slightly in order to accommodate a conical hollow mill or the like (not shown) for forming the frusto-conical surfaces. This slight angular displacement of the axes of the frusto-conical surfaces does not adversely affect the operation of the constant velocity joint. The universal joint 136 transmits universal constant velocity drive between the swash barrel and the cylinder barrel regardless of the swash angle because the driving contact between the drive studs 138 and the drive splines 140 is always at the same distance from the axes 54 and 56. Furthermore, the universal joint is exceedingly simple and very inexpensive to fabricate.

The pistons 52 are five in number in the specific embodiment illustrated. Each comprises a piston rod or shank 154 having an integral spherical ball end portion 156 at one end and a separable piston head assembly 158 at the other end. The ball ends are slightly larger in diameter than the piston heads and are of conventional full ball design except that they include a center groove 160 which acts as a lubricant reservoir.

The piston head assembly 158 includes a "shell type" piston 162 and a locking clip 164. The piston head 162 fits over an integral enlarged head attachment portion 166 formed on the end of the rod 154 opposite from the ball end 156. The head attachment portion 166 has a spherical end face 168 which is formed from a spherical center coinciding with the spherical center of the ball end 156. This spherical end surface 168 is adapted to engage a planar surface 170 perpendicular to the axis of the piston head 162 and formed on an internal integral button 172 within the piston head. Inasmuch as the center of the spherical surface 168 is at the center of the ball 156, the spherical surface 168 rolls on the planar surface 170 as the piston head 162 is pivoted with respect to the rod portion 154, thus eliminating sliding friction.

The piston head 162 is provided with spherical retaining surfaces 174 which are adapted to mate with spherical socket surfaces 176 formed in a segmental annular boss within the piston head, as shown, in position for retaining the piston head on the end of the piston rod. The spherical center for the surfaces 174 occurs at the point of intersection of the axis of the rod 154 with the spherical surface 168.

To allow the piston head 162 to be mounted on the enlarged end portion 166, four mounting notches 178 are formed through the enlarged portion 166 and four mounting notches 180 are formed through the boss forming the spherical surfaces 176 within the piston head. When the piston rod 154 is rotated 45° with respect to the piston head 162 from the position shown in FIGURE 7, the piston head can be readily assembled on the piston rod, and when the parts are rotated 45° relative to one another after assembly, they are universally pivotally locked in place as shown in the figures. The grooves 178 and 180 permit ready access of lubricating oil for the spherical surfaces 168 and 174 and their mating surfaces.

The piston head is prevented from rotating from its locked position by means of the locking clip 164. This locking clip comprises a split spring ring of sheet metal or the like having a pair of locking prongs 182 which are inserted into an opposite pair of opposed grooves 178 and 180 as shown in FIGURES 7 and 8. The locking clip 164 includes a pair of integral tabs or lugs 184 which are snapped into a pair of opposed lightening holes 186 formed through the skirt of the piston head 162. When the locking lugs 184 are snapped into place in the lightening holes 186, the spring clip 164 cannot be accidentally withdrawn from within the piston head. However, the parts can be intentionally disassembled very readily by squeezing the spring clip 164 radially inwardly to release the locking lugs thus permitting the locking clip 164 to be removed so that the piston head can be removed from the piston rod by rotating it 45° and moving it axially off the piston attachment portion 166. In this manner, the parts can be readily inspected and replaced if necessary.

It will be noted that the piston head 162 is of extremely light or "shell" construction so that the piston head can be readily fitted within its mating cylinder with very little or no clearance without any reasonable danger of seizing. The light construction of the piston permits the absorption of expansion forces within the material of the piston head itself due to the inherent resilience of the material.

To aid in tight fitting of the piston head within the cylinder while still preventing scoring or seizing, the piston skirt may be split at opposite positions, as shown by the reference numeral 188 (FIGURE 7). This permits the skirt to be flared slightly if desired and provides clearance for skirt expansion which might occur, for example, if the piston head should be suddenly subjected to high temperature hydraulic fluid.

A noteworthy feature of the piston assembly 52 is the location of the center of pivoting between the piston head 162 and the end of the rod 154 very close to the pressure end of the piston head. As a result the effective pressure force on the piston end acts on a vector which coincides, or very nearly coincides, with the line of force transmittal between the point of tangency of the surfaces 166 and 168 and the center of the ball end 156. Accordingly, there is no resultant side load against the cylinder wall when the rod axis and piston head axis are angularly disposed. This permits the use of a piston head which is very much shorter and very much lighter than those of conventional constructions.

The pistons 52 are operatively associated with the cylinder block mechanism 50 and the swash mechanism 48 in a manner best shown in FIGURES 4 and 5. The respective ball ends 156 of the pistons are universally pivotally retained in respective ball sockets 190 formed in circumferentially spaced relation in the left end portion of the swash barrel 60. The piston heads 162 of the pistons are reciprocably disposed in respective close fitting cylinders 192 which are formed in circumferentially spaced relation in the cylinder barrel 112, corresponding to the positions of the ball sockets 190 formed in the swash barrel. The arrangement is such that as the swash barrel 60 is rotated, the piston heads 162 are reciprocated in the cylinders 192 with the stroke of the pistons varying as the swash angle.

The constant velocity universal joint 136 "times" or synchronizes the speed of rotation of the cylinder barrel 112 so that it corresponds exactly with the speed of rotation of the swash barrel regardless of the swash angle. It will be seen that the universal joint does not take full torque between the swash barrel and the cylinder barrel merely synchronizes their rotation. The primary torque is transferred from the swash barrel to the cylinder barrel through the thrust of the pistons as they are reciprocated.

The ball ends 156 of the pistons are retained in the ball sockets 190 by a retainer plate 194 which is fixedly secured on the left end of the swash barrel by means of an axial attachment bolt 196. The attachment bolt 196 is threadedly inserted through a central aperture in the plate 194, and the head of the bolt presses against a sealing washer 198 which, in turn, engages a shoulder 200 within the central bore in the swash barrel. When the bolt is drawn up tightly, the sealing washer 198 prevents leakage from the casing into the central bore of the swash barrel. The retainer plate 194 is formed with piston apertures 202 and ball sockets 204 corresponding to the ball sockets 190 so that the piston ball ends are retained in the sockets 190 upon the return or suction strokes of the pistons.

The cylinder block mechanism end cap 114 is formed with an inlet "kidney" port 206 and an outlet "kidney" port 208, so called because of their kidney shape as best seen in FIGURE 3. The inlet kidney port 206 is connected to the inlet port 36 through an inlet passage 210, and the outlet kidney port 208 is connected to the outlet port 38 through an outlet passage 212. When the pump mechanism is rotated in a clockwise direction when viewed from the port end, the cylinders receive hydraulic fluid from the inlet kidney port 206 and discharge this hydraulic fluid under pressure through the outlet port 208 by means of respective cylinder ports 214.

The pump mechanism includes simplified means for conducting hydraulic fluid between the housing ports 36 and 38 and the cylinder ports 214 regardless of the swash angle. Such means include a port block 216, an inlet port shoe 218 and an outlet port shoe 220. The port block 216 is fixedly secured to the inner face of the housing end cap 30 by means of a pair of dowel pins 222 (only one shown) which are disposed in close-fitting opposed bores formed in the port block and the housing end cap. A pair of apertures are formed through the port block so that when the block is in place as shown in the figures, the apertures form continuations of the inlet passage 210 and the outlet passage 212. O-rings 224 of suitable resilient sealing material are disposed in sealing grooves formed in the port block adjacent the inner face of the housing end cap, about the inlet port 210 and the outlet port 212, in order to prevent leakage between the housing end cap and the port block.

The inner face of the port block 216 is formed with a segmental cylindrical surface 226 which has its axis at the swash pivot axis 135. The outer face 228 of the swash mechanism end cap 114 is also provided with a segmental cylindrical surface 228 from the same axis, but the radius of this surface is slightly smaller, so that a noticeable clearance is provided between the two segmental cylindrical surfaces for ease of fabrication and assembly.

The port shoes 218 and 220 are disposed with sliding clearance in respective grooves 230 and 232 formed in the cylinder end cap 114, and they are provided with segmental cylindrical end faces 234 and 236, respectively. These segmental cylindrical end faces are formed from the pivot axis 135, and they abut and are complementary with the segmental cylindrical face 226 of the port block 216 to provide sliding seals against the face 226. The port shoe 218 overlies the inlet passage 210 and the port shoe 220 overlies the exhaust passage 212 regardless of the swash angle between zero displacement and maximum displacement. The shoes have elongated passages therethrough, as shown, which are substantially greater in cross-sectional area than the kidney ports 206 and 208 so that they do not impede the flow of hydraulic fluid regardless of the swash angle.

The port shoes 218 and 220 are closely fitted within the respective grooves in the cylinder block end cap, and suitable resilient sealing rings 238 and 240, herein shown as "chevron" style seal rings, are fitted in mating grooves provided about the periphery of each of the shoes to prevent leakage around the shoes.

Four light seating springs 242 are disposed in blind bores formed in the cylinder end cap 114 underneath each of the shoes, as best seen in FIGURES 3 and 5. These seating springs provide an initial resilient seating force urging the shoes into seated position against the mating surface of the port block 216.

Since the exhaust port shoe 220 is subjected to considerably higher pressure than the inlet port shoe 218, a support web 244 may be formed integrally between the two elongated edge portions of the shoe 220 to prevent the shoe from expanding under pressure a sufficient amount that it would bind in the groove 232 to prevent proper sealing against the port block.

The port shoes 218 and 220 are pressure-loaded toward their sealing positions by reason of a pressure unbalance. Since the sealing surfaces 234 and 236 are initially urged against the surface 226 of the port block by the springs 242, the pressure within the inlet and outlet passages is not communicated between the sealing surfaces and the port block surface. Accordingly, the pressure behind the port shoes urges the shoes into sealing engagement. It will be seen that the effective pressure area is equal to the projected area of the sealing surfaces 234 and 236, assuming no leakage. Of course, the greater the pressure in the respective ports, the greater is the sealing force, which, of course, is what is desired.

The pressure loading force on the shoes 218 and 220 is reduced when the areas of the sealing surfaces 234 and 236 are reduced, but, at the same time, reduced sealing areas lessen the adverse effect of imperfections in formation of the sealing surfaces. If slight leakage does occur, the leakage pressure will obviously be less than the pressure in the inlet and outlet passages, so that a pressure unbalance is still provided for pressure-loading the shoes. In practice, sealing areas are chosen which will insure sufficient pressure-loading force on the shoes to prevent all or substantially all leakage without exerting excessive force against the surface 226 of the port block. It will be understood that the surfaces 226, 234 and 236 are accurately ground to insure good sealing.

For preventing rotation of the cylinder end cap 114 and for guiding the end cap in its movement with respect to the port block 216, a pair of guide keys 246 are fixedly secured to the end cap and ride in close fitting slidable relation in a guide groove 248 formed in the central portion of the face 226 of the port block. This arrangement permits free pivoting of the tiltable cylinder block mechanism 50 but still prevents rotation of the end cap 114 and the pivot control ring 118.

The end cap 114 is pressure-loaded against the left hand surface of the cylinder barrel 112 in order to provide a good rotating seal therebetween and also to provide a positive force for seating the pivots 132 in the pivot notches 134. To accomplish these purposes an annular pressure relief groove 250 is formed in the end surface of the cylinder barrel 112 (FIGURES 4 and 9), and this pressure relief groove is vented to the relatively low casing pressure by means of a plurality of radial grooves 252. This leaves only a controlled area 254 on the end face of the cylinder barrel which could be subjected to pressure greater than casing pressure (due to possible leakage from the cylinder ports 214 of pistons which are on the pressure stroke). To more than counterbalance this leakage pressure tending to unseat the end cap 114 from the cylinder barrel is the pressure in the outlet passage 212 acting on the internal surfaces in the end cap, urging the end cap into engagement with the end of the cylinder barrel. Thus, a controlled pressure-loading is applied to the end cap 114, and, of course, this pressure loading increases with increase in outlet pressure. In practice, the relief grooves 250 and 252 are formed in a manner such that the pressure loading will be sufficient to prevent substantially all leakage but no greater.

It will be noted that the relief grooves 250 and 252 still leave substantial bearing area for adequately supporting the pressure-loaded end cap 114. Furthermore, the grooves are so located as to provide a good lubricating film between the opposed surfaces.

Inasmuch as the pump mechanism of the present invention is intended to operate at extremely high speeds, i.e. 24,000 r.p.m. or higher, it is essential that the bearings and other moving parts receive adequate lubrication. At such speeds, however, the problems of lubrication are considerably complicated by the fact that the tremendous centrifugal forces generated tend to starve the central portions of the mechanism of lubricating oil. Furthermore, at such speeds lubricating films tend to break down quite readily. According to the present invention advantage is taken of this very centrifugal force which causes the lubrication difficulties to induce constant lubrication flow to the vital moving parts, regardless of the pump output flow.

The lubrication inlet and outlet ports 44 and 46 are connected to a supply of lubricating fluid, preferably the same fluid as that being pumped. A very slight pressure is imposed at the inlet port 44 to make certain that lubricating fluid is available to be drawn through the pump mechanism. It will be noted that the port aperture for the inlet is considerably smaller than for the port outlet to make sure that no substantial pressure will be built up in the casing.

As the swash barrel 60 is rotated a flow of lubricating fluid is induced through the roller bearings 70 and 72 and through the thrust bearing 74 by reason of the fact that the thrust ball bearings operate at a greater effective radius than the rollers 76 and 78. In other words, advantage is taken of centrifugal force on the lubricating fluid to cause the lubricating fluid to flow through the bearings.

The ball bearing 116 is lubricated in a similar centrifugal manner by forming a lubricant outlet 256 through the pivot control ring 118. It will be noted that the radius of the race 124 adjacent the lubricant outlet 256 is greater than the radius on the side of the bearing toward the right as seen in FIGURE 4. Thus, as the bearing is rotated, a centrifugal flow of lubricating fluid is induced from the right toward the left and out the lubricating outlet 256. The size of the outlet 256 is carefully chosen to limit the flow to that required for proper lubrication and no more.

Lubrication of the piston ball ends 156 is quite difficult because of their inaccessibility. Again, however, a centrifugally induced lubrication flow is provided. In this instance the lubrication flow is from the casing into the guide groove 248 of the port block 216, through a central bore 258 formed through the cylinder end cap 114, and through a connecting central bore 260 formed through the cylinder barrel 112. From here it is necessary to bridge the gap between the cylinder barrel and the swash barrel, and this is accomplished through a lubrication fitting 262 which has a central bore 264 connecting with a central blind bore 266 formed in the left end portion of the attachment bolt 196.

The fitting 262 has a ball end 268 which is disposed in a mating socket 270 at the outward end of the bore 266. At its other end the fitting 262 has a similar universal ball end 272 which is mounted in a mating socket 274 formed in a shiftable seat member 276. The seat member 276 is resiliently urged against the ball end 272 of the fitting 262 to urge the fitting into seating position at its other ball end by means of a light compression spring 278. This spring is disposed in the bore 260 in the cylinder barrel and is bottomed on a shoulder therein. The shiftable seat 276 includes a central bore 280 which permits lubricant flow from the bore 260 into the bore 264 in the fitting 262.

The lubricating passage to the piston ball ends 156 is continued by formation of radial passages 282 in the attachment bolt 196 which lead from the bore 266 to an annular lubricating groove 284 formed about the shank of the bolt 196. To complete the lubricating passage, respective lubricant feed notches 286 are formed in the left end face of the swash barrel 60 to feed lubricating fluid from the annular groove 284 to each of the ball sockets 190. It will be seen that the lubricating notches 286 feed the lubricant grooves 160 in the ball sockets 156 as the pump mechanism is rotated.

Since the piston ball ends are provided with working clearance in the ball sockets and since the ball ends are rotating at a high rate of speed relative to the axis 56 of the swash barrel a continuous centrifugal flow of lubricating fluid is induced through each ball socket. The lubricating flow is limited to that flow necessary for proper lubrication, and no more, by providing suitable restriction in the lubricant flow passage.

*Control Apparatus 26*

The control apparatus 26 is constructed and arranged to maintain a substantially constant output of fluid pressure from the pump mechanism by varying the displacement of the pump in accordance with the output requirements. The control apparatus includes generally a pressure sensing piston 290 and a swash angle control piston 292.

In a manner to be described in detail, the sensing piston 290 senses the outlet pressure of the pump mechanism, and when this pressure reaches a pre-determined "maximum control pressure," the sensing piston directs pressure fluid to the control piston 292 which moves the cylinder block 50 to a smaller swash angle. This reduces the pump output flow which results in a reduced pressure for any given output requirement. At a pre-determined "minimum control pressure," the pressure on the control piston is vented through the sensing piston to casing pressure, and a spring moves the cylinder block mechanism toward a greater swash angle to increase the pump displacement and flow and to increase the output pressure. The predetermined maximum and minimum control pressures are preferably quite close to one another and define a relatively narrow outlet pressure control range.

The sensing piston 290 is of relatively small diameter and is of the spool type, having an upper annular pressure groove 294 and a lower annular relief groove 296 with an annular control land 298 therebetween. The piston 290 is slidably disposed in a close fitting cylinder 300 which is preferably formed in a cylinder barrel member 302 which, in turn, is tightly fitted in a blind bore 304 in the housing end cap 30. The cylinder member 302 is held in place by means of a hollow threaded member 306 which is threadedly inserted in a larger threaded bore 308 formed below and coaxial with the bore 304. A bearing washer 310 is disposed between the upper end of the attachment member 306 and a shoulder formed at the juncture of the two bores, and the bottom end of the cylinder barrel 302 rests this bearing washer. An appropriate resilient sealing O-ring 312 is disposed at the bottom end of the threaded bore 308 about the attachment member 306 to prevent leakage out of the casing.

Within the hollow threaded member 306 a relatively heavy coil compression spring 314 is disposed. The spring is bottomed on the blind bottom end within the threaded member 306, and the upper end of the spring engages an annular spring seat member 316. A compression rod 318 extends through the bearing washer 310 with clearance, between the spring seat 316 and the sensing piston 290. It will be noted that the compression rod 318 is disposed along the common axes of these members and has its ends inserted in respective elongated blind bores 320 and 322 in the spring seat and the piston. The opposite end portions of the compression rod 318 engage at the exact centers of each member at points near the opposite ends of these members. This eliminates any tendency of the two members to tip or to bind, which is particularly important with respect to the piston 290.

Relatively light dampener compression springs 324 and 326 act in opposite directions from the bearing washer 310 against the piston 290 and spring seat 316, respectively. The dampener springs tend to hold the sensing piston in a balanced position as shown in FIGURE 4 when the outlet pressure is within the desired control range, and they dampen fluctuations in valve position to inhibit control hunting.

Pressure of the outlet port 38 is impinged against the top end of the sensing piston 290 through a control passage 328 which connects the outlet port with the upper blind end of the bore 304 above the piston. A pair of control ports 330 in the cylinder member 302 extend between the piston bore 300 and an annular control groove 332 formed about the outer periphery of the cylinder member. A bleed groove 334 is formed in the upper edge portion of the sensing piston 290 to bleed outlet pressure into the pressure groove 294. Another bleed groove 336 is formed through the bottom edge portion of the piston to connect the exhaust groove 296 with the chambers below the piston containing the springs 324, 326 and 314. These latter three chambers are exhausted to the interior of the pump casing through an exhaust passage (not shown). Thus, the piston groove 294 and the area above the sensing piston 290 are subjected to working or outlet pressure of the pump while the areas below the land 298, in the groove 296 and below the piston, are subjected to the very low casing pressure.

The control piston 292 is closely fitted within a bore 338 of a cylinder barrel member 340 and the cylinder member is fixedly secured in an integral boss 342 formed in the casing 24 within a bore 344. The cylinder member 340 may be fixedly secured to the casing by means of a plurality of attachment screws 346 which extend through an integral attachment flange 348 formed at the bottom end of the cylinder member. A plurality of ports 349 are formed through the wall of the cylinder member 340 and communicate with an enlarged portion of the bore 344, forming an annular pressure chamber 350. An annular groove 351 is formed about the piston 292 and communicates with the bore 338 below the piston through one or more notches 352. The pressure chamber 350 is connected by an appropriate passage (not shown) with the pressure control groove 332 formed about the sensing piston. Accordingly, the pressure control groove 332 is always in communication with the bore 338 below the control piston 292.

A control boss 354 is integrally formed on the side edge portion of the pivot control ring 118 substantially in axial alignment above the control piston 292. The control boss 354 is provided with a lower segmental spherical socket 356 which is directly above a segmental spherical socket 358 at the bottom of a conical recess 360 formed in the control piston 292. A compression rod 362 extends between the two sockets and has an upper ball end 364 engaged in the socket 356 and a lower ball end 366 engaged in the socket 358. The socket 358 is purposely formed in the bottom portion of the control piston 292 and symmetrical with its axis so that force transmitted between the boss 354 and the piston will not subject the piston to any off-center load and thus will not cause the piston to cock or bind in the cylinder 342.

A pair of resilient sealing O-rings 368 are disposed at opposite ends of the annular pressure chamber 350. One O-ring engages the flange 348 of the piston barrel and the other O-ring engages a shoulder formed at the juncture of the two portions of the bore 344. A light compression spring 370 is disposed between the two O-rings to hold them in place so that they will prevent leakage from the pressure chamber.

A coil compression control spring 372 is disposed directly above the control piston 292 in a blind chamber 374 of a spring seat member 376. The seat member 376 is threadedly secured in a threaded bore 378 formed in an integral boss 380 on the housing 24 directly above and axially aligned with the boss 342. A sealing O-ring 382 is disposed in a suitable groove at the upper end of the threaded bore 378 about the seat member 376 and below an integral abutment flange 384 in order to prevent any leakage from the housing out the bore. The control spring 372 engages a movable spring seat member 386, and a compression rod 388 has its upper end portion disposed in a blind axial chamber 390 formed in the movable seat member. The lower end of the compression rod 388 is engaged in an upper socket 390 formed in the control lug 354 directly above the lower socket 356. An axial compression force is exerted by the control spring 372 through the compression rod 388 to the control lug 354 tending to move the cylinder block 50 to its maximum displacement position as shown in FIGURES 4 and 6. Force exerted by the piston 292 acts in opposition through the compression rod 362, tending to move the cylinder block mechanism toward its zero displacement position.

Operation

In general, the pump mechanism of the present invention pumps fluid from the inlet port 36 to the outlet port 38 as the swash barrel 60 is rotated. The control mechanism 26 maintains the outlet pressure within the predetermined control range by controlling the swash angle, which, in turn, varies the pump displacement. Accordingly, the pump maintains a substantially constant design outlet pressure throughout the range from zero displacement to maximum displacement at any given rotational speed.

The pump is driven through any suitable high speed drive source (not shown) such as a gas turbine capable of operating at 24,000 r.p.m., or even speeds up to 48,000 or 60,000 r.p.m. The drive is through a splined drive shaft (not shown) which is inserted through the drive shaft opening 40 of the housing 24 and which drivingly engages the splines 111 of the swash barrel 60. As the swash barrel is rotated the cylindrical barrell 112 is rotated in exactly timed relation and the pistons 52 are reciprocated in the cylinders 192 with a stroke depending upon the swash angle.

When the pump mechanism is rotated in a counterclockwise direction looking at the drive end, hydraulic fluid is drawn in the inlet port 36 and through the inlet kidney port 206 into the cylinders 192 in which the pistons are on their suction strokes. Pistons which are on their compression strokes deliver hydraulic fluid under pressure out the kidney outlet port 208 and the outlet port 38 where it is directed by any suitable conduit means (not shown) to various hydraulic servo mechanisms to be actuated (not shown).

Referring to FIGURE 4, it will be noted that the pivot axis 135 of the cylinder block mechanism 50 is located slightly above the bottom of the "swash circle," which is the circle defined by the centers of the piston ball ends 156. Since the pivot axis defines the pivoting movement between the cylinder block mechanism and the swash plate mechanism, the pivot axis must be perpendicular to the plane defined by the axes 54 and 56 of these respective mechanisms. As explained before, the pivot axis 135 also defines an angle equal to ½ the swash angle at maximum displacement with respect to a line which is drawn through the point of intersection of the axes 54 and 56 at maximum swash angle and perpendicular to the axis 56. In other words, the pivot axis 135 must be on a line which bisects the angle between the axes 54 and 56 when the mechanism is at maximum swash angle in order to insure that the two axes coincide at zero displacement of the pump mechanism. This line will be referred to as the "half angle line." Location of the pivot axis on the half angle line simplifies the construction of the mechanism considerably and minimizes the clearance required in the constant velocity universal joint 136 as the swash angle is changed between zero and maximum angle.

It has been customary in variable displacement swash plate devices of this type to place the pivot axis at the point of intersection of the swash axis with the cylinder block axis. According to the present invention, however, the pivot axis 135 is disposed considerably below the drive axis 56. This insures that the pressure force within the cylinders will always urge the cylinder block mechanism toward the maximum displacement position. To understand this, it must be borne in mind that all of the pistons on compression stroke exert a force in the direction of their axes tending to push the cylinder block away from the swash barrel.

When pistons on compression stroke are above the pivot axis, they tend to pivot the cylinder block mechanism toward maximum swash angle, and when such pistons are below the pivot axis, they tend to move the cylinder block mechanism toward zero displacement. As the mechanism rotates, the resultant of these forces shifts up and down depending upon the positions of the pistons on pressure stroke. If the pivot axis is at or near the intersection of the swash and cylinder barrel axes, this shifts the resultant of the forces to opposite sides of the pivot axis, which tends to cause fluctuations of the cylinder block mechanism alternately toward zero displacement and toward maximum displacement depending upon piston position.

The pivot axis according to the present invention is moved downwardly a sufficient distance along the "half angle line" to a position where the pressure force of the pistons always tends to urge the mechanism toward the maximum displacement position. It is undesirable to move the pivot axis too far downwardly because then the positive force towards maximum displacement becomes excessively large requiring increased control forces. It has been found that the most desirable position for the pivot axis is slightly above the bottom of the swash circle as shown in FIGURE 4. In this position, the force tending to pivot the cylinder block mechanism always tends to move it toward maximum displacement, but this force is not excessive as it would be if the pivot axis were moved downwardly below the swash circle. Thus, the pivot axis is located on the half angle line below the point where piston thrust would tend to move the mechanism toward zero displacement and above the point where control forces become excessive. As a rule of thumb, this latter point occurs at or slightly below the bottom of the swash circle.

It will be noted that the control spring 372 also tends to move the cylinder block mechanism towards maximum displacement. Thus, the mechanism is always in this position at start to insure maximum pumping capacity and to reduce danger of cavitation.

In order that there will be no additional forces (except the force of the control piston 292) tending to pivot the cylinder block mechanism in either direction, the port shoes 218 and 220 are exactly centered with respect to the knife-edge 132 and, of course, with respect to the pivot axis 135. Thus, the pressure forces exerted in the cylinder block end cap 114 and the spring forces exerted through the springs 242 are exactly balanced and have no effect in pivoting the cylinder block mechanism in either direction.

It should be noted that the pressure forces exerted against the end cap 114 are always toward the pivot axis. These forces more than balance the pressure forces in the cylinder tending to unseat the pivot. Accordingly, whenever the pump is operating, the knife-edge pivot is always seated by positive pressure force and no journal means or other auxiliary means are required to maintain the pivot in position. When the pump is not operating, the port shoe springs 242 exert sufficient pressure to hold the knife-edge pivot in place.

While the pivot axis 135 is advantageously located as described, it will be seen that the axis could be located at the intersection of the swash axis 56 and the cylinder axis 54 in order to make the device reversible. This would introduce a tendency for the cylinder barrel to be urged alternately toward zero displacement and maximum displacement, but this tendency can be compensated for in the control apparatus 26. It will be understood that with such an arrangement all of the advantages of knife-edge pivoting would still be enjoyed. In other words, the knife-edge pivot would still be held in place by a positive balanced pressure and the advantages of the pressure-loaded port shoes 218 and 220 would still be enjoyed.

As the pump mechanism begins to rotate at start (at maximum displacement as explained), a pressure is immediately built up in the outlet port 38. As soon as the pressure reaches maximum control pressure, the sensing piston 290 is depressed in opposition to the force of the spring 314 allowing pressure from the outlet port to communicate, through the various passages, with the control cylinder 340 below the control piston 292. The size of the control piston and the force exerted by the control spring 372 are such that outlet pressure below the control piston will cause the piston to move upwardly to pivot the cylinder block mechanism 50 toward a reduced displacement position. As the displacement is reduced, the pressure in the outlet port is also reduced, assuming that the output requirements remain the same.

When the outlet pressure is reduced to the minimum control pressure, the sensing piston 290 moves upwardly until the control boss 298 blocks the ports 330 to cut communication between the outlet port 38 and the control piston 292. As the sensing piston 290 continues to move upward, the pressure below the control piston 292 is vented below the control land 298 of the sensing piston into the vent groove 296 where it is vented to casing pressure. This allows the control piston 292 to move downwardly again in response to spring pressure and in response to working pressure in the pump mechanism as explained. As a result, the swash angle increases which increases the pump output. This, in turn, causes the outlet pressure to increase until it reaches maximum control pressure, causing the sensing piston 290 to move downwardly again. This causes a reduction in the displacement of the pump as explained and again reduces the pump outlet pressure.

The dampening springs 324 and 326 are balanced when the sensing piston 290 is in the position shown in FIGURE 4 where the control land 298 blocks the passages 330. Accordingly, the dampening springs tend to stabilize the operation of the control and to inhibit hunting. It is possible to eliminate the dampening springs, if desired, because control hunting is minimal with the control arrangement described so that the outlet pressure can be maintained accurately within a few pounds.

The particular pump illustrated is designed to operate at a design outlet pressure of 3,000 p.s.i. Therefore, the maximum control pressure is set at or slightly above 3,000 p.s.i. while the minimum control is set slightly below or at 3,000 p.s.i. It will be understood, however, that the design outlet pressure can be raised or lowered by varying the compression force exerted by the spring 314 acting on the sensing piston 290. As the compression of this spring is increased, it will be apparent that the design outlet pressure will also be increased. Of course, the design pressure can also be changed by changing the size of the sensing piston 290. A decrease in sensing piston size will cause an increase in design outlet pressure for the same spring force.

In general, the pump mechanism of the present invention provides a substantially constant pump outlet pressure and a varying output flow depending upon the requirements of the hydraulic servo mechanisms being actuated. In a system properly mated with the pump, the maximum displacement is sufficient to operate all of the servo mechanisms being actuated, at design outlet pressure. When no mechanisms are being actuated, the mechanism will automatically move to, or close to its zero displacement position, providing a flow just sufficient to overcome any leakage while still maintaining design pressure.

Throughout the range of swash angles, the piston head clearance at top dead center remains substantially constant, and therefore a very small head clearance may be provided as shown. With a small head clearance at top dead center, danger of pump cavitation is greatly reduced, particularly at or near zero displacement where the cavitation problem is ordinarily most acute.

To illustrate the compactness and efficiency of the hydraulic mechanism according to the present invention, it is noted that a specific embodiment substantially as shown has been constructed and successfully tested. This embodiment is designed to operate at 24,000 r.p.m. or higher, and at this speed the flow at maximum displacement is approximately 5 gals. per minute at 3,000 p.s.i. Yet the pump, which is practically all steel, weighs only about 1¾ lbs. and is less than 4½" in length. The inlet and outlet ports are conveniently located at one end which makes for a small pump envelope.

The pump control is constructed so that the moment of inertia of parts regulating pump displacement is very low. Furthermore, the cylinder barrel mechanism is pivoted on low friction knife-edge pivots which are so located that pressure force of the pistons always urges the barrel mechanism toward maximum displacement but without excessive force. The knife-edge pivots are held in place by a balanced pressure force which does not affect the control operation. Accordingly, a very simple control is utilized which accurately controls outlet pressure without control hunting.

It will be readily apparent that the various concepts of the present invention are applicable to various types of swash plate piston type fluid devices. The particular embodiment illustrated is especially adaptable for use as a hydraulic pump in an auxiliary power unit driven by a gas turbine for use in missiles or space vehicles. The device shown can also be efficiently used as a hydraulic motor.

Variations and modifications may be effected without departing from the scope of the novel concepts of the present invention.

I claim:

1. In a fluid device wherein a rotatable swash member is universally drivingly connected with a rotatable cylinder member and a plurality of pistons are operatively disposed between the members for reciprocation in the cylinder member, the improvement comprising; a swash support element for rotatably carrying the swash member, a cylinder support element for rotatably carrying the cylinder member, means on said elements tiltably and separably supporting one of said elements against the other of said elements for relative angular movement therebetween, whereby the strokes of the pistons may be changed by tilting said elements relative to one another, and means positively biasing said elements toward each other to hold said elements in engagement at said supporting means.

2. In a fluid device wherein a rotatable swash member is universally drivingly connected with a rotatable cylinder member and a plurality of pistons are operatively disposed between the members for reciprocation in the cylinder member, the improvement comprising; a swash support element for rotatably carrying the swash member, a cylinder support element for rotatably carrying the cylinder member, knife edge means operatively disposed between said elements and tiltably supporting one of said elements against the other of said elements whereby the strokes of the pistons may be changed by tilting said elements relative to one another, and means positively biasing said elements toward each other to hold said elements in engagement at said knife edge means.

3. In a fluid device wherein a rotatable swash member is universally drivingly connected with a rotatable cylinder member and a plurality of pistons are operatively disposed between the members for reciprocation in the cylinder member, the improvement comprising; a swash support element for rotatably carrying the swash member, a cylinder support element for rotatably carrying the cylinder member, knife edge means operatively disposed between said elements and pivotally supporting one of said elements against the other of said elements for changing the strokes of the pistons, and pressure means holding said elements in engagement at said knife edge means.

4. In a fluid device wherein a rotatable swash member is universally drivingly connected with a rotatable cylinder member and a plurality of pistons are operatively disposed between the members for reciprocation in the cylinder member, the improvement comprising; a swash support element for rotatably carrying the swash member, a cylinder support element for rotatably carrying the cylinder member, knife edge means pivotally supporting one of said elements against the other of said elements for changing the strokes of the pistons, and pressure means holding said elements in engagement at said knife edge means, the force exerted by said pressure means being balanced with respect to the axis of pivoting of said elements.

5. In a fluid device wherein a rotatable swash member is universally drivingly connected with a rotatable cylinder member and a plurality of pistons are operatively disposed between the members for reciprocation in the cylinder member, mechanism associated with said members for changing the strokes of the pistons up to a predetermined maximum stroke comprising; a swash support element for rotatably carrying the swash member, a cylinder support element for rotatably carrying the cylinder member, and means between said elements supporting one of said elements with respect to the other of said elements for pivoting about a pivot axis, said pivot axis being perpendicular to the plane defined by the axes of rotation of said members and intersecting said plane at a point on the line bisecting the angle between said axes at maximum piston stroke, said point being displaced from the axis of rotation of the swash member in the direction which said cylinder support element pivots relative to said swash support element in increasing piston stroke.

6. A fluid device comprising; a rotatable swash member universally drivingly connected with a rotatable cylinder member, a plurality of pistons operatively disposed between said members for reciprocation in said cylinder member, a swash support element rotatably carrying said swash member, a cylinder support element rotatably carrying said cylinder member, and means between said elements supporting one of said elements with respect to the other of said elements for pivoting about a pivot axis, said pivot axis being located so that the resultant of the pressure forces on said pistons always urges said one element in the direction of maximum piston stroke, said pivot axis further being located so that the head clearance of said pistons reciprocating in said cylinder member remains substantially constant between maximum and minimum displacement of said fluid device.

7. In a fluid device wherein a rotatable swash member is universally drivingly connected with a rotatable cylinder member and a plurality of pistons are operatively disposed between the members for reciprocation in the cylinder member, mechanism associated with the members for changing the strokes of the pistons comprising; a swash support element for rotatably carrying the swash member, a cylinder support element for rotatably carrying the cylinder member, knife edge means between said elements pivotally supporting one of said elements against the other of said elements, internal pressure areas in the cylinder member subjected to outlet fluid pressure urging the cylinder member away from the swash member, and means associated with said cylinder support element providing opposing pressure areas having greater effective area than said internal pressure areas, said opposing pressure areas being subjected to outlet fluid pressure urging said cylinder member toward said swash member to hold said elements in engagement at said knife edge means with a force varying as the outlet pressure.

8. In a fluid device wherein a rotatable swash member is universally drivingly connected with a rotatable cylinder member and a plurality of pistons are operatively disposed between the members for reciprocation in the cylinder member, mechanism associated with the members for changing the strokes of the pistons up to a predetermined maximum stroke comprising; a swash support element for rotatably carrying the swash member, a cylinder support element for rotatably carrying the cylinder member, and knife edge means between said elements supporting one of said elements against the other of said elements for pivoting about a pivot axis, said axis being perpendicular to the plane defined by the axes of rotation of said members and intersecting said plane at a point on the line bisecting the angle between said axes at maximum piston stroke, said point being located on said line at least as close to the axis of rotation of one of said members as to the centers of pivoting of said pistons with respect to said swash member, and said point further being located on said line so that the resultant of the pressure forces on the pistons always urges said one element in the direction of maximum piston stroke.

9. In a fluid device wherein a rotatable swash member is universally drivingly connected with a rotatable cylinder member and a plurality of pistons are pivotally secured to the swash member and disposed for reciprocation in the cylinder member, mechanism associated with the members for changing the strokes of the pistons up to a predetermined maximum stroke comprising; a swash support element for rotatably carrying the swash member, a cylinder support element for rotatably carrying the cylinder member, and knife edge means on one of said elements supporting said one element against the other of said elements for pivoting about a pivot axis, said pivot axis being perpendicular to the plane defined by the axes of rotation of the members and intersecting said plane at a point adjacent the centers of pivoting of the pistons when at top dead-center.

10. A fluid device according to claim 9 wherein said point is located on the line bisecting the angle between said axes at maximum piston stroke and slightly closer to the axis of rotation of the swash member than the centers of pivoting of the pistons.

11. A fluid device comprising a rotatable swash member universally drivingly connected with a rotatable cylinder member, a plurality of pistons operatively disposed between said members for reciprocation in said cylinder member, mechanism pivotally supporting said members within respect to one another for changing the strokes of said pistons, said mechanism including a swash support element rotatably carrying said swash member and a cylinder support element rotatably carrying said cylinder member, stationary structure having a segmental cylindrical surface facing said cylinder member and centered at the axis of pivoting of said members, said stationary structure having spaced inlet and outlet ports in said cylindrical surface, inlet and outlet passage means carried by said cylinder support element and in communication with said cylinder member, and an inlet port shoe carried in said inlet passage means, an outlet port shoe carried in said outlet passage means, said port shoes having respective segmental cylindrical end surfaces complementary to and in slidable engagement with the segmental cylindrical surface on said stationary structure, said port shoes overlying the respective inlet and outlet ports and having apertures therethrough connecting the inlet port with the inlet passage means and the outlet port with the outlet passage means, means biasing said port shoes against said segmental cylindrical surface and means biasing said cylinder support element toward said swash support element.

12. A fluid device according to claim 11, wherein said means biasing said port shoes against said segmental cylindrical surface includes pressure surfaces provided on said support shoes opposite to said segmental cylindrical end surface whereby pressure in the respective passages urges said shoes into sealed engagement against the segmental cylindrical surface of said stationary structure, and spring means resiliently urging said shoes against said stationary structure to provide an initial sealing force.

13. In a fluid device wherein a rotatable swash member is universally drivingly connected with a rotatable cylinder member and a plurality of pistons are operatively disposed between the members for reciprocation in the cylinder member, the improvement comprising; a swash support element for rotatably carrying the swash member, a cylinder support element for rotatably carrying the cylinder member, means between the said elements pivotally supporting one of said elements against the other of said elements whereby the stroke of the pistons may be changed by tilting said elements relative to one another, means urging said elements toward each other to hold said elements in engagement at said supporting means, stationary structure adjacent said one element and having a key way formed therein on an arc about the axis of pivoting of said elements, and a pair of keys carried by said one element and slidably engaging said key way for guiding pivotal movement of said element.

14. In a fluid device wherein a rotatable swash member is universally drivingly connected with a rotatable cylinder member and a plurality of pistons are operatively disposed between the members for reciprocation in the cylinder member, mechanism for pivotally supporting the members with respect to one another for changing the strokes of the pistons comprising; a port end cap rotatably secured to and abutting the cylinder member, said port end cap having an inlet passage and an outlet passage formed therein, a stationary port block having a segmental cylindrical surface centered at the axis of pivoting of said members and located adjacent said port end cap, said port block having an inlet port and an outlet port through said cylindrical surface and a port shoe located in each of said passages, each port shoe having a segmental cylindrical end surface complementary to and in slidable engagement with the segmental cylindrical surface on said port block, said port shoes overlying the respective inlet and outlet ports and having apertures therethrough connecting the inlet port with the inlet passage and the outlet port with the outlet passage, said port block having a circumferential keyway formed in said cylindrical surface between said inlet and outlet ports, and a pair of keys carried by said port end cap and slidably engaged in said keyway for guiding pivotal movement of said port end cap and the cylinder member.

15. In a fluid device including a housing in which a rotatable swash member is universally drivingly connected with a rotatable cylinder member and a plurality of pistons are operatively disposed between the members for reciprocation in the cylinder member, the improvement comprising; a cylinder support element for rotatably carrying the cylinder member, a swash support element for rotatably carrying the swash member, a frusto-conical seat formed in the housing about one of said support elements with the widest portion of said seat facing the other of said support elements, and a support ring formed on said one support element and having an annular segmental spherical surface engaging said seat, whereby thrust forces of the pistons are transmitted through said support ring and into said frusto-conical seat in the housing.

16. In a fluid device including a housing in which a rotatable swash member is universally drivingly connected with a rotatable cylinder member and a plurality of pistons are operatively disposed between the members for reciprocation in the cylinder member, the improvement comprising; a cylinder support element for rotatably carrying the cylinder member, a swash support element for rotatably carrying the swash member, one of said support elements comprising a hollow generally tubular shell, antifriction bearing means between one of the members and said one support element, said bearing means including a thrust bearing at one end portion of said one support element and a radial support bearing at the other end of said one support element, a frusto-conical seat formed in the housing about one portion of said support element with the widest portion of said seat facing said other support element, a cylindrical seat formed in the housing about said other end portion of said one support element, a thrust support ring formed about said one end portion of said one support element and having an annular segmental spherical surface engaging said seat whereby thrust forces of the pistons are transmitted through said thrust support ring and into said frusto-conical seat in the housing, and a radial support ring formed about said other end of said one support element and having an annular segmental spherical surface engaging said spherical seat.

References Cited in the file of this patent

UNITED STATES PATENTS

| | | |
|---|---|---|
| 225,651 | Silver | Mar. 16, 1880 |
| 1,931,969 | Thoma | Oct. 24, 1933 |
| 2,273,468 | Ferris | Feb. 17, 1942 |
| 2,353,917 | Molly | July 18, 1944 |
| 2,407,013 | Ifield | Sept. 3, 1946 |
| 2,424,035 | Ifield | July 15, 1947 |
| 2,649,741 | Henrichsen | Aug. 25, 1953 |
| 2,752,214 | Ferris | June 26, 1956 |
| 2,860,581 | Buckner | Nov. 18, 1958 |
| 2,871,798 | Thoma | Feb. 3, 1959 |
| 2,900,921 | Brown | Aug. 25, 1959 |
| 2,915,985 | Budzich | Dec. 8, 1959 |
| 2,956,508 | Wahlmark | Oct. 18, 1960 |
| 2,956,845 | Wahlmark | Oct. 18, 1960 |
| 2,967,491 | Wiggermann | Jan. 10, 1961 |
| 2,987,006 | Bowers et al. | June 6, 1961 |
| 2,990,784 | Wahlmark | July 4, 1961 |

FOREIGN PATENTS

| | | |
|---|---|---|
| 864,511 | Germany | Dec. 11, 1952 |